United States Patent
Mardikar et al.

(10) Patent No.: US 9,491,200 B2
(45) Date of Patent: *Nov. 8, 2016

(54) ROLE-BASED ATTRIBUTE BASED ACCESS CONTROL (RABAC)

(71) Applicant: PayPal, Inc., San Jose, CA (US)

(72) Inventors: Upendra S. Mardikar, San Jose, CA (US); Jeffrey Meyer, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,491

(22) Filed: May 1, 2015

(65) Prior Publication Data

US 2015/0237074 A1    Aug. 20, 2015

Related U.S. Application Data

(63) Continuation of application No. 13/925,732, filed on Jun. 24, 2013, now Pat. No. 9,027,091, which is a continuation of application No. 13/226,325, filed on Sep. 6, 2011, now Pat. No. 8,474,018.

(60) Provisional application No. 61/380,089, filed on Sep. 3, 2010.

(51) Int. Cl.
*H04L 29/06*    (2006.01)

(52) U.S. Cl.
CPC .............. *H04L 63/20* (2013.01); *H04L 63/08* (2013.01); *H04L 63/105* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 6,453,353 B1* | 9/2002 | Win | ...................... | G06F 21/604 709/225 |
| 6,668,322 B1* | 12/2003 | Wood | ...................... | G06F 21/41 713/182 |
| 7,886,346 B2* | 2/2011 | Sandhu | ................... | G06F 21/31 709/229 |
| 7,908,644 B2* | 3/2011 | Roskind | ................. | G06F 21/31 705/66 |

OTHER PUBLICATIONS

Kuhn et al., Adding Attributes to Role-Based Access Control, IEEE, Jun. 2010.*
Kuhn et al., "Adding Attributes to Role-Based Access Control", Jun. 15, 2010, pp. 79-81, IEEE Computer Society, Los Alamitos, CA.

* cited by examiner

*Primary Examiner* — Minh Dinh
(74) *Attorney, Agent, or Firm* — Haynes and Boone, LLP

(57) ABSTRACT

Systems and methods are disclosed for receiving an access request from a user device, the access request including an identity claim for a user; evaluating a risk of access based on matching an attribute of the user device with attributes stored in a user information database; authenticating the access request based on the identity claim and the risk evaluation to determine an authentication confidence level; generating a token based on the confidence level and the attribute matched; producing an authorization response based on inputs from the token, a risk based access control, a role based access control, and an attribute based access control, in which the authorization response determines whether to allow access to a system, deny access to the system, or request additional input from the user device.

20 Claims, 3 Drawing Sheets

ROLE-BASED ATTRIBUTE BASED ACCESS CONTROL (RABAC)

CROSS REFERENCE TO RELATED APPLICATIONS

This application is a continuation of and claims benefit of priority to U.S. patent application Ser. No. 13/925,732, filed Jun. 24, 2013, which is a continuation of U.S. patent application Ser. No. 13/226,325, filed Sep. 6, 2011, now U.S. Pat. No. 8,474,018, issued Jun. 25, 2013, which claims priority to U.S. Provisional Application No. 61/380,089, filed on Sep. 3, 2010, all of which are incorporated by reference.

BACKGROUND

1. Technical Field

The present disclosure generally relates to access control for security administration and, more particularly, to systems and methods for providing access control to computer network-based and web-based services.

2. Related Art

One of the most important challenges for providing services on large networks such as the Internet is administration of security for access to those services, which can include merchant services and financial transactions and involve different levels of access to various types of information for different users.

A number of different types of access controls have arisen out of these challenges. Two of these are Discretionary Access Controls (DAC) and Mandatory Access Controls (MAC). DAC is an access control system that permits system users to allow or disallow other users to have access to objects (e.g., information, application programs, devices) under their control. According to one definition, DAC includes controls that are discretionary in the sense that a subject (e.g., system user) with a certain access permission is capable of passing that permission (perhaps indirectly) on to any other subject (unless restrained by mandatory access control). MAC, according to one definition, provides a means of restricting access to objects based on the sensitivity (as represented by a label) of the information contained in the objects and the formal authorization (i.e. clearance) of subjects to access information of such sensitivity. In general, MAC is more centrally administered than DAC, e.g., access policy is determined by the system and usually not by individual users (e.g., an "owner" of the information as could occur with DAC). With MAC, security administration can be costly and prone to error because administrators usually specify access control lists for each user on the system individually.

A more recent development is Role Based Access Control (RBAC) in which, like MAC, access policy is determined more by the system, than by the "owner" (e.g., access is not discretionary based on existing permissions). A subject (e.g., system user) is assigned one or more roles and authorization is based on each resource and action in the system requiring membership in a particular role in order to proceed. With RBAC, security may be managed at a level that corresponds closely to the organization's structure. Each user is assigned one or more roles, and each role is assigned one or more privileges that are permitted to users in that role. Security administration with RBAC includes determining the operations that must be executed by persons in particular jobs, and assigning users to the proper roles.

Another example is Attribute Based Access Control (ABAC) in which access is granted based on attributes of the subject (e.g., the user), the resource (e.g., object) being accessed, the action the user wants to perform on or with the resource, and the environment. For example, the user's name and password, the privacy aspects of the object (e.g., account information), whether read or write access is sought, and type of encryption being used may be values of attributes that can affect whether an access is granted or denied under ABAC.

SUMMARY

According to one or more embodiments of the present invention, methods and systems for access control provide enhanced access control security through the use of a unique combination of authentication context, confidence estimation, identity assurance, risk assessment, attributes, and roles that may be included in an underlying role-based attribute based access control (RABAC) model. Access control may be provided for users to connect to services and resources of a service provider (SP) over a network, such as the Internet or a local area network (LAN), using a consumer electronic device, for example, to connect to servers operated by the service provider.

In one or more embodiments, a system provides access control for access by an access device to the system and includes: a server executing a server application for communication with the access device, in which the server application receives an identity claim from the access device; an authentication service in communication with the server, in which the authentication service receives the identity claim from the server application; a risk service in communication with the authentication service, in which the risk service provides a risk evaluation to the authentication service based on applying a risk model to the identity claim; and the authentication service provides a token to the server application based on the identity claim and the risk evaluation; and an authorization service in communication with the server application and the risk service, in which the authorization service receives the token from the server application; and the authorization service provides a response whether to allow access to the system by the access device according to the token, and input from a risk based access control, a role based access control, and an attribute based access control.

In another embodiment, a computer-implemented method includes: receiving an access request from a user device, wherein the access request includes an identity claim for a user; evaluating a risk based on matching an attribute of the user device with attributes stored in a user information database; authenticating the access request based on the identity claim and the risk evaluation to determine an authentication confidence level; generating a token based on the confidence level and the attribute matched; and producing an authorization response based on inputs from the token, a risk based access control, a role based access control, and an attribute based access control, in which the authorization response determines whether to allow access to a system, deny access to the system, or request additional input from the user device.

In a further embodiment, a computer program product comprises a non-transitory computer readable medium having computer readable and executable code for instructing a processor to perform a method that includes: receiving an access request from a user device, wherein the access request includes an identity claim for a user; evaluating a risk based on matching an attribute of the user device with attributes stored in a user information database; authenticating the access request based on the identity claim and the risk evaluation to determine an authentication confidence level; generating a token based on the authentication confidence level and the attribute matched; and producing an authorization response based on inputs from the token, a risk based access control, a role based access control, and an attribute based access control, in which the authorization response determines whether to allow access to a system, deny access to the system, or request additional input from the user device.

DETAILED DESCRIPTION

In accordance with embodiments of the present invention, access control may be provided for users to connect to services and resources of a service provider (SP) over a network, such as the Internet or a local area network (LAN), using, for example, a consumer electronic device to connect to servers operated by the service provider. Access control security may be enhanced through the use of a unique combination of authentication context, confidence estimation, identity assurance, risk assessment, attributes, and roles that may be included in an underlying role-based attribute based access control (RABAC) model. The user may establish an identity with the service provider through a process referred to as "on-boarding". The on-boarding process may establish attributes of the user's identity that can be asserted as claims for purposes of authentication in subsequent requests to access the system.

Figure 1:
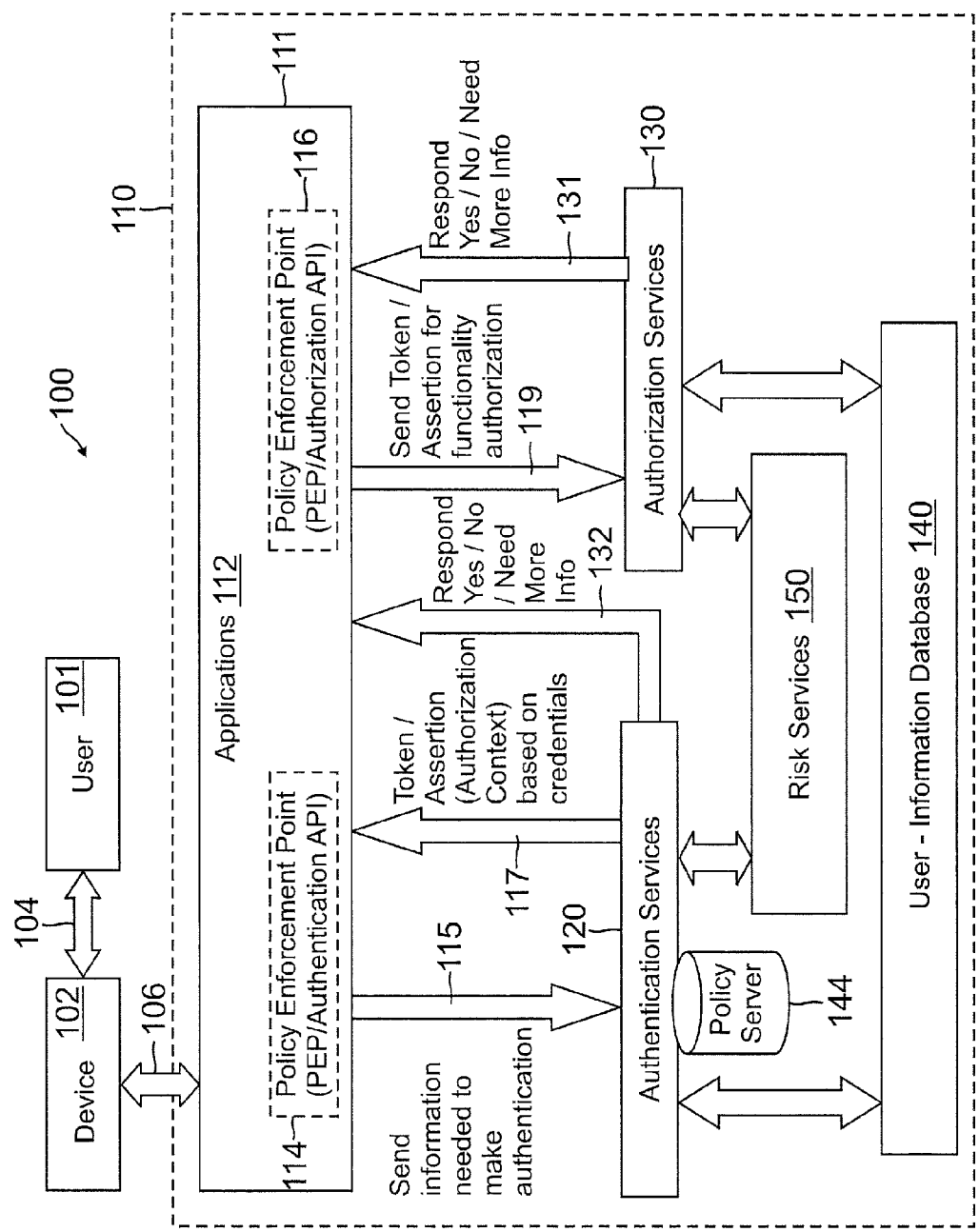
FIG. 1 is a system diagram illustrating an access control system for providing a user access to a system through a device in accordance with one or more embodiments.

FIG. 1 illustrates a system 100 for providing access control for a user 101 (also referred to as "subject") access to a service provider system 110 through a user device 102 (e.g., a consumer electronic device such as a smart phone, also referred to as "access device") in accordance with one or more embodiments. The service provider operating service provider system 110 may be, for example, a financial service provider (FSP)—such as PayPal, Inc. of San Jose, Calif.—in which a consumer or vendor using the service may have an account with the FSP (referred to as an "FSP account"). Service provider system 110 may operate or execute server applications 112, for example, on one or more servers 111 to provide services for customers such as user 101. Applications 112 may provide access control to service provider system 110, for example, using policy enforcement points (PEP) 114, 116. For example, each server application 112 may have an application programming interface (API) that enables its policy enforcement point to communicate with authentication services 120 and authorization services 130, each of which may be, for example, a process running on a server, e.g., server 111 or policy server 144.

User 101 wishing to access services provided by the service provider may enter claims 104 (which may include, for example, credentials and identity claims) into user device 102. In general a claim may be regarded as an assertion of the truth of something, typically something which may be disputed or in doubt. An implicit claim may be one that is not explicitly entered by a subject and an explicit claim may be one that is explicitly entered by a subject. An attribute may refer to a verified claim, where verification can be performed, for example, by the service provider, a third party, or may be self-asserted for certain types of claims. Thus, verification or identity proofing may be regarded as a process of converting claims to attributes. The definition of verification may assume that there is an assurance level (e.g., confidence, which may be expressed as probability level from 0 to 100%) commensurate with the intended use of the identity or claim within the system. Authentication may be regarded as a process in which the subject's assertion of a particular identity in the system is validated and a binding of the subject and the particular identity occurs. A confidence level may be expressed on the binding. Authentication and binding also apply to matching claims to attributes. Authorization is generally based on the assurance of identity proofing and confidence level of authentication for a particular session; authorization may in general refer to providing a determination of what a subject can do on the system.

The claims 104 may be included with information 106, which may also include such things as attributes, e.g., international mobile equipment identification (IMEI) number, of user device 102 and be transmitted, for example, via a network such as the Internet, to server 111 of service provider system 110 for use by applications 112. For example, server application 112 may communicate through PEP 114 authentication information 115 to authentication services 120. Authentication services 120 may have access to a user information database 140, which may be used to store user identities, e.g., credentials and claims associated with each user. Authentication services 120 may have access to processes running on a policy server 144, which may provide policy decisions, for example, for expressing or applying rules that evaluate identity and authentication level trust scoring along with rules to render decisions using a combination of role and attribute based expressions. Authentication services 120 also may be, as shown in FIG. 1, in communication with risk services 150. Authentication services 120 may use as input identity claims (e.g., included in claims 104, information 106, and authentication information 115), information from user information database 140, information from policy server 144, and information (e.g., risk evaluation) from risk services 150 to provide a token 117 to server application 112 via PEP 114. As seen in FIG. 1, token 117 may, for example, form an assertion including an authorization context (e.g., information added to the assertion that provides the details needed for the server application 112 to make an informed entitlement decision) and may be based on the user credentials and inputs just described.

Server application 112 may send a token 119 to authorization services 130, for example, via PEP 116. The token 119, as seen in FIG. 1, may include an assertion for functionality authorization, e.g., an assertion of what the subject can do on the system 110. The authorization services 130 may receive the token 119 from the server application 112 and may also communicate with and receive inputs from risk services 150 and user information database 140, as shown in FIG. 1. The authorization services 130 may provide a response 131 whether to allow access to the system 110 by the access device 102 according to input from the token 119, and input from a risk based access control (e.g., input from risk services 150), a role based access control model and policies, and an attribute based access control model and policies, both or either of which may use input from user information database 140. In an alternative embodiment, the authentication services 120 may provide a response 132 whether to allow access to the system 110 by the access device 102 according to an authentication confidence level, a role based access control model and policies, and an attribute based access control model and policies, both or either of which may use input from user information database 140.

Computation or processing of the response 131 by authorization services 130, or in the alternative example, response 132 by authentication services 120, may incorporate any combination of, for example: 1) an identity attribute trust level (e.g., what is the system's 110 confidence level in the set of user-identifying attributes—such as phone number, e-mail address, street address, social security number (SSN)—to establish an individual's identity) also referred to as identity assurance level; 2) a device trust level, in which system 110 may gather certain identifying properties of the access device 102. For example, system 110 may use historic device information about the device to modify the device trust level. For instance, if the same user uses the same device regularly, system 110 may increase trust or, conversely, if the device has been involved in fraudulent or suspicious activity, the trust level may be reduced; or 3) authentication claim trust level (e.g., what is the system's 110 confidence in the secret information—such as simple user name-password, two-factor authentication (2FA), biometric identification, or other mechanisms—provided to the system 110 at the time of authentication) also referred to as authentication confidence level.

The authorization services 130, in processing response 131, or in the alternative example, authentication services 120 in processing response 132, also may incorporate, for example, a role based access control model and policies (e.g., based on a set of roles, the system 110 gives users within each specific role a set of capabilities to act on certain resources in the system 110).

The authorization services 130, in processing response 131, or in the alternative example, authentication services 120 in processing response 132, also may incorporate, for example, an attribute based access control model and policies (e.g., based on various attributes associated with a user of the system 110, the system 110 determines the user's capabilities based on the value of the various attributes).

The authorization services 130, in processing response 131, or in the alternative example, authentication services 120 in processing response 132, also may incorporate, for example, a risk based access control (e.g., based on the basic privilege determination by the role based access control and attribute based access control, the system 110 may add additional decisions around access granting based on the confidence level of system 110 in both the identity and authentication mechanism used). In some situations, for example, the result of the additional risk-based decision may be that additional user action needs to be taken prior to granting access. These additional actions may include establishing more identity trust by providing more information about the subject (e.g., SSN, tax, business information, or other identifying factors) or by presenting more security claims (e.g., using 2FA, answering security questions in addition to basic login and password, or responding to challenges around existing attributes known to the system such as last four digits of SSN).

Figure 2:
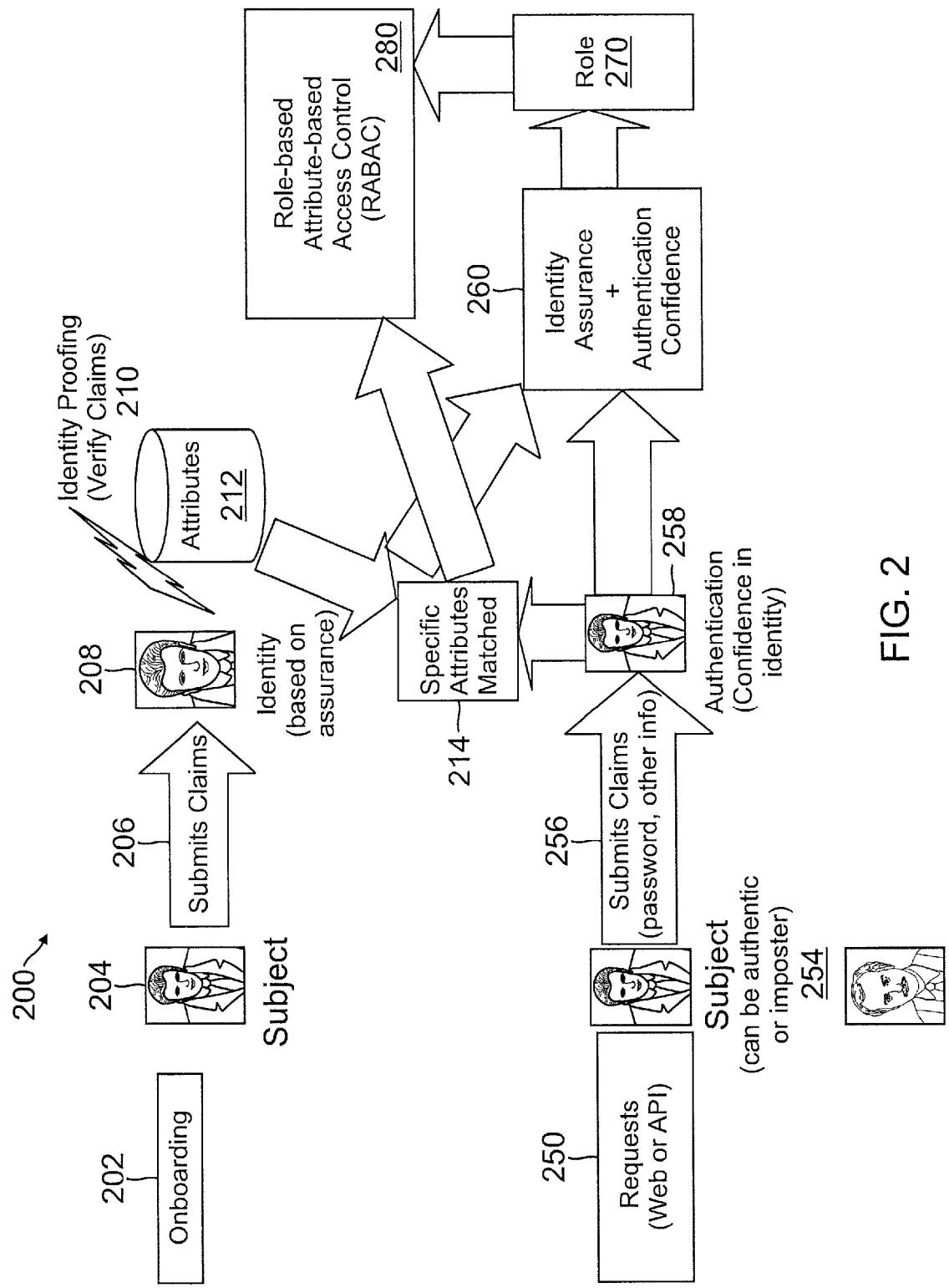
FIG. 2 is a data flow diagram illustrating operation of an access control system in accordance with one or more embodiments.

FIG. 2 illustrates operation of an access control system 200 in accordance with one or more embodiments. In an on-boarding process 202, a subject 204 may submit claims 206 to establish an identity 208 with the service provider, e.g., service provider system 110. A process 210 of identity proofing may be performed to verify claims 206. Process 210 of identity proofing may provide a set of attributes 212 associated with identity 208 of subject 204. Attributes 212 may be stored, for example, in user information database 140. Attributes 212 may be provided to process 214 for matching specific attributes and providing further input, for example, to a process 260 for identity assurance and authentication confidence or, for example, to a process 280 for role-based attribute based access control (RABAC) 280, as seen in FIG. 2.

In a request process 250, a subject 254 (who may be authentic or an imposter) may request access to system 110 by submitting claims 256. Claims 256 may be processed by an authentication process 258, which may be executed, for example, by authentication services 120 shown in FIG. 1. Authentication process 258 may provide specific attributes from the claims 256 to process 214, for example, for further processing by RABAC process 280. Authentication process 258 also may provide an authentication confidence level (e.g., confidence in an identity 208 matching its user 204, or in the specific case, confidence in the claims 256 being made by an authentic subject 254) from the claims 256 to process 214, for example, for further processing by identity assurance and authentication confidence process 260. Identity assurance and authentication confidence process 260 may provide input to role process 270, which may, for example, provide further input regarding roles assigned to subject 254 to RABAC process 280.

For example, if the transaction requested by a subject is the purchase of digital goods less than $5 in amount, the RABAC process 280 may make a decision based on the following criteria: 1) is the identity assurance level >50%, e.g., output of process 260 expressed as a confidence or probability level; 2) is the authentication confidence level >70%, e.g., output of process 260; 3) is the machine identity, device trust level >60%, e.g., output of process 260; 4) is the zip-code, street number or other address attribute provided, e.g., output of process 214. If a yes answer is given to 1) through 4), access may be granted by service provider system 110 to allow the transaction.

For another example, if the transaction requested by the subject is to send money to some recipient, the amount being in excess of $2,000,000 in amount, the RABAC process 280 may make a decision based on the following criteria: 1) is the identity assurance level >70%; 2) is the bank account number on file, e.g., in the user information database 140; 3) is the customer (subject) 2FA authenticated, e.g., authentication confidence level corresponds to 2FA authentication; 4) is the authentication confidence level of the request (whether based on machine identity, credential, or other) >80%. If a yes answer is given to 1) through 4), access may be granted by service provider system 110 to allow the transaction.

Figure 3:
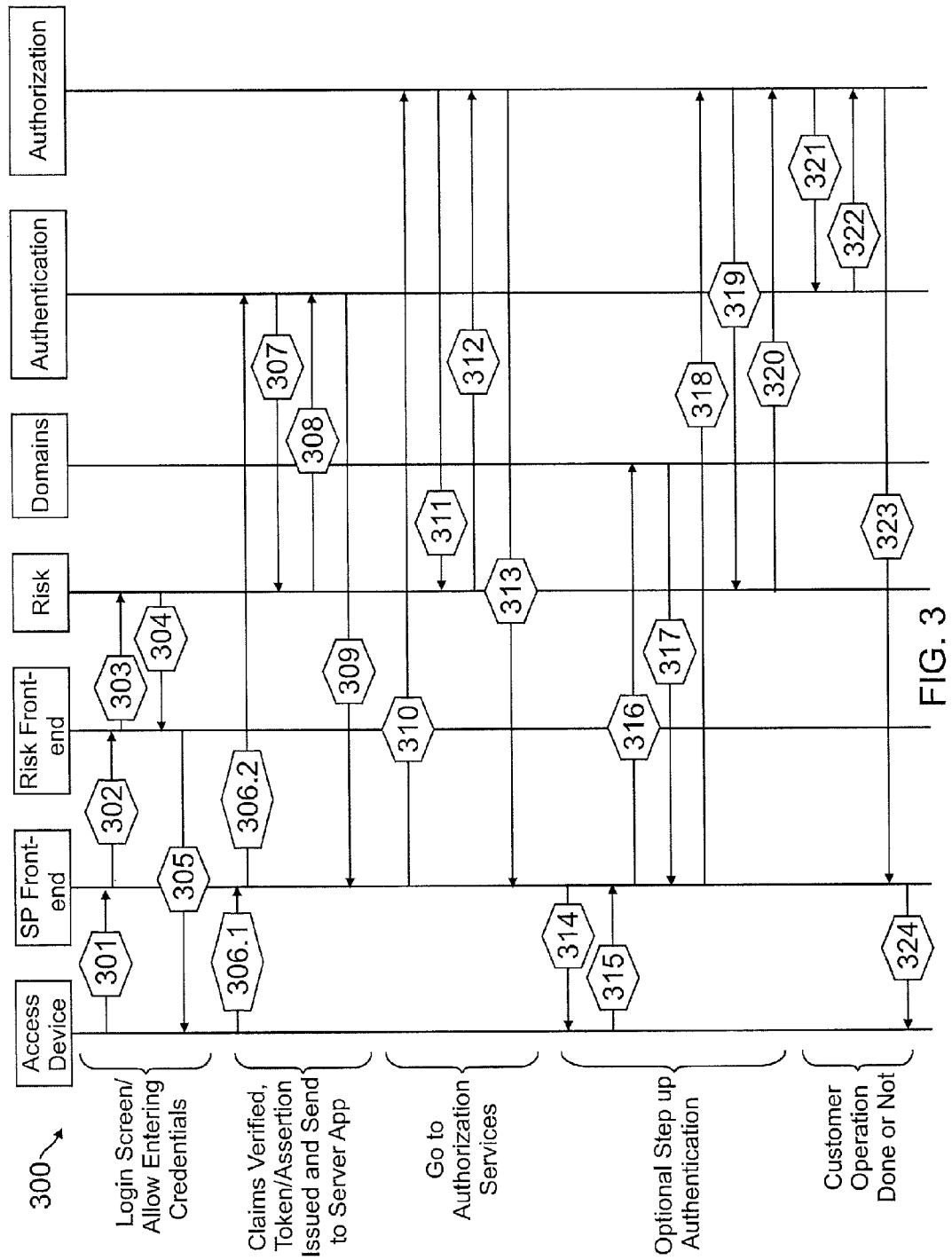
FIG. 3 is a sequence flow diagram illustrating operation of an access control system in accordance with an embodiment.

FIG. 3 illustrates a sequence of information flow 300 in an access control system in accordance with an embodiment. Sequence steps 301 to 305 may be summarized as a process of providing a login screen for a customer (subject) and allowing the subject to enter credentials. At sequence step 301, a subject (e.g., user 101, subject 204, subject 254) may have entered credentials or claims into a user device (e.g., access device 102) and the access device (or, for example, a browser running on the device) sends a request to a front end application (e.g., server application 112). At sequence step 302, the front end application (e.g., server application 112) may send input (e.g., data included in the request such as credentials and claims) to a risk front end (e.g., authentication services 120) to find out if the access device is a known bad access device (e.g., stolen or involved in fraudulent activity). At sequence step 303, risk models may be run, for example, by risk services 150. Risk models may be customized according to requirements of system 110, for example, or the service provider. At sequence step 304, risk services 150 may return a result to the risk front end that the access device is either acceptable or not. At sequence step 305, the risk front end may return a result to the subject (e.g., customer) either to proceed or that access is denied. Even if allowed to proceed at this stage, access may be denied further on.

Sequence steps 306 through 312 may be summarized as a process of verifying claims, issuing the authentication token, and continuing the process at the authorization system (e.g., authorization services 130 or RABAC process 280.

At sequence step 306.1 of step 306, a subject (e.g., customer) may enter the subject's credential or credentials into the access device to be sent to the service provider front end (e.g., server application 112). Step 306.1 may be optional if credentials are available from step 301. At sequence step 306.2, claims (e.g., credentials, device or other attributes) may be sent to an authentication sub-system (e.g., authentication services 120). The authentication sub-system may have calibrated authentication levels that may be specified in the RABAC model (e.g., programming of RABAC process 280). At sequence step 307, the authentication sub-system may communicate with a risk sub-system (e.g., risks services 150) to get data and session and identity scores. At sequence step 308, based on the specific attributes for identity and authentication, and using a risk evaluation from the risk sub-system, an authentication confidence level is created (e.g., initial calculation is performed) by the authentication sub-system. At sequence step 309, the authentication sub-system may generate a security assertion markup language (SAML) or session token (e.g., token 117, shown in FIG. 1) based on both the authentication confidence level and the attribute (e.g., subject or device attribute, action attribute, resource attribute, or environment attribute, for example) matched. An authentication context may optionally be sent (as shown in FIG. 1, with token 117). At sequence step 310, the service provider front end (e.g., server application 112) may transfer control or execution or communicate with an authorization engine (e.g., authorization services 130. At sequence step 311, the authorization engine may communicate with the risk sub-system to find out if the operation (e.g., action requested to be performed by the subject with access device using the resource requested with environment attribute present) can be allowed. At sequence step 312, if the risk sub-system provides a negative risk evaluation, the risk sub-system may inform the authorization engine not to allow the operation. On the other hand, if the risk sub-system provides a positive risk evaluation, the risk sub-system may inform the authorization engine to allow the operation and the sequence flow may jump past sequence step 324 to continue with the operation and allowing access to the system (e.g., system 110) via the access device (e.g., device 102).

Sequence steps 313 through 323 may be summarized as a process of optional step-up authentication in the event that an attempt at access has failed.

At sequence step 313, the authorization engine may inform the service provider front end (e.g., server application 112) the operation is not allowed. At sequence step 314, the service provider front end may communicate with the access device, for example, prompting the subject (e.g., user or customer) to retry or to enter additional information such as additional credentials or claims. At sequence step 315, for example, the customer may enter additional information such as the last four digits of a credit card number. At sequence step 316, the additional information may be sent to an appropriate domain or service that verifies if the additional information is on file or not. At sequence step 317, verification results may be sent back to the service provider front end. At sequence step 318, the new request may be sent to the authorization engine which may consult with the risk sub-system in sequence step 319 to find out if the operation can be allowed. At sequence step 320, the risk sub-system may provide either a negative risk evaluation or a positive risk evaluation as before. At sequence step 321, the authorization engine may send the request to the authentication sub-system (e.g., authentication services 120) to generate a new token (e.g., a new token 117 as seen in FIG. 1) at a new level. At sequence step 322, the new token may be returned back to the authorization engine via the service provider front end (e.g., server application 112) from the authentication subsystem. At sequence steps 323, 324, the authorization engine may inform the service provider front end (e.g., server application 112) and the user via the access device whether or not the operation is allowed. If not allowed additional step authorizations may be attempted or access may be denied. If allowed, as with sequence step 312, the sequence flow may jump past sequence step 324 to continue with the operation and allowing access to the system (e.g., system 110) via the access device (e.g., device 102).

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system including an access control for providing controlled access to the system by a user device, the system comprising:
   a hardware processor executing a risk service, an authentication service, and an authorization service, wherein:
   the risk service provides one or more risk evaluations based on running one or more risk models customized for the system;
   the authentication service is in communication with the risk service and an interface, and
      based on specific attributes from a credential, and using a first risk evaluation requested from the risk service, the authentication service performs an authentication confidence level calculation; and
      based on both the authentication confidence level and the specific attributes from the credential, the authentication service provides a first assertion including an authorization context to the interface; and
   the authorization service is in communication with the risk service and the interface, wherein based on a second assertion for functionality authorization received from the interface, and using a second risk evaluation requested from the risk service, the authorization service provides a response to the interface whether to allow access to the system by the user device according to input from the second assertion for functionality authorization, a risk based access control, a role based access control, and an attribute based access control.

2. The system of claim 1, wherein the authentication service receives the credential from the interface.

3. The system of claim 1, wherein:
   the credential is included in an identity claim received from the user device; and
   the first risk evaluation returns a result from the risk service that the user device is either acceptable or not.

4. The system of claim 1, wherein the second assertion for functionality authorization, received from the interface by the authorization service, is received from a server application in communication with the interface.

5. The system of claim 1, wherein the authorization context, included in the first assertion provided to the interface from the authentication service, comprises details needed for a server application in communication with the interface to make an entitlement decision and provide the second assertion for functionality authorization.

6. The system of claim 1, wherein the interface is an application programming interface (API) of an application that enables a policy enforcement point of the application to communicate with the authentication service.

7. The system of claim 1, wherein the interface is an application programming interface (API) of an application that enables a policy enforcement point of the application to communicate with the authorization service.

8. The system of claim 1, wherein the authentication service receives the credential from the user device communicating with an application that passes the credential through a policy enforcement point that communicates with the authentication service.

9. The system of claim 1, wherein:
   the credential is included in an identity claim received from the user device; and the first risk evaluation is based on applying a risk model to the identity claim.

10. The system of claim 1, wherein
the second risk evaluation informs the authorization service whether or not an action requested to be performed by a user with the user device using a resource requested with an environment attribute present is allowable.

11. A method for risk based, role based, attribute based access control to a system, using an access device, the method comprising:
receiving, from an interface to an application executing on a server processor, a credential that includes one or more specific attributes;
requesting a first risk evaluation from a risk service;
performing an authentication confidence level calculation based on the one or more specific attributes and the first risk evaluation;
providing to the interface, based on both the authentication confidence level and the one or more specific attributes from the credential, a first assertion that includes an authorization context;
receiving, from the interface, a second assertion for functionality authorization;
requesting a second risk evaluation from the risk service; and
based on the second assertion for functionality authorization and the second risk evaluation, providing a response to the interface whether to allow access to the system by the access device according to input from a risk based access control, a role based access control, and an attribute based access control.

12. The method of claim 11, wherein receiving the credential, requesting the first risk evaluation, performing the authentication confidence level calculation, and providing the first assertion results from executing an authentication service on a hardware processor.

13. The method of claim 11, wherein receiving the second assertion, requesting the second risk evaluation, and providing the response to the interface results from executing an authorization service on the hardware processor.

14. The method of claim 11, wherein the first risk evaluation is based on running one or more risk models customized for the system and results from executing a risk service on a hardware processor.

15. The method of claim 11, wherein the second risk evaluation results from executing a risk service on a hardware processor and is based on one or more risk models customized for the system.

16. The method of claim 11, wherein the first risk evaluation is based on at least one of the specific attributes.

17. The method of claim 11, wherein the credential is included in an identity claim received from the access device; and further comprising:
returning a result, from a risk service, in the first risk evaluation that the access device is either acceptable or not.

18. The method of claim 11, further comprising:
including in the authorization context of the first assertion details needed for the application to provide the second assertion for functionality authorization for a user of the access device.

19. A non-transitory machine-readable medium having stored thereon machine-readable instructions executable to cause a machine to perform operations comprising:
receiving from an interface to an application executing on a server processor, a credential for access to an access-controlled system in communication with an access device, wherein the credential includes one or more specific attributes;
providing a first risk evaluation for the credential based on running one or more risk models customized for the access-controlled system;
performing an authentication confidence level calculation based on the specific attributes and the first risk evaluation;
providing to the interface, based on the authentication confidence level, a first assertion that includes an authorization context;
receiving, from the interface, a second assertion for functionality authorization;
providing a second risk evaluation for the second assertion for functionality authorization based on running one or more risk models customized for the access-controlled system; and
based on the second risk evaluation, providing a response to the interface whether to allow access to the access-controlled system by the access device according to input from a risk based access control, a role based access control, and an attribute based access control.

20. The non-transitory machine-readable medium of claim 19, the operations further comprising:
including in the authorization context of the first assertion details needed for the application to provide the second assertion for functionality authorization for a user of the access device.

* * * * *